(12) United States Patent
Griepentrog et al.

(10) Patent No.: US 6,810,088 B1
(45) Date of Patent: Oct. 26, 2004

(54) METHOD FOR TRANSMITTING DATA VIA A TRACTION CONTROL WHICH CARRIES AN ELECTRICAL DRIVING CURRENT FOR VEHICLES

(75) Inventors: Gerd Griepentrog, Gutenstetten (DE); Reinhard Maier, Herzogenaurach (DE); Peter Priebe, Wolfenbuettel (DE); Egid Schneider, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,014

(22) PCT Filed: Feb. 22, 2000

(86) PCT No.: PCT/DE00/00556

§ 371 (c)(1),
(2), (4) Date: Oct. 17, 2000

(87) PCT Pub. No.: WO00/50285

PCT Pub. Date: Aug. 31, 2000

(30) Foreign Application Priority Data

Feb. 22, 1999 (DE) .......................................... 199 09 244

(51) Int. Cl.[7] .............................................. H04L 27/00
(52) U.S. Cl. ....................................................... 375/259
(58) Field of Search ................................ 375/257, 259; 246/218, 219, 220, 246, 253; 318/727; 340/310.01

(56) References Cited

U.S. PATENT DOCUMENTS 5,586,736 A * 12/1996 Mollet ......................... 246/194

6,597,137 B1 * 7/2003 Griepentrog et al. ....... 318/434

FOREIGN PATENT DOCUMENTS

| DE | 538 650 C | 6/1928 |
| DE | 730 713 C | 4/1940 |
| GB | 1 521 722 | 7/1975 |

OTHER PUBLICATIONS

"The communication channels of systems Telemekanism".

Dostert et al., "Neuartige Datenuebertragung auf Stromversorgungsleitungen", Elektro–Anzeiger, 42(12):31–34 (1989).

* cited by examiner

*Primary Examiner*—Don N. Vo
(74) *Attorney, Agent, or Firm*—Morrison & Foerster LLP

(57) ABSTRACT

A method for transmitting data via a traction current conductor which simultaneously conducts drive current for a vehicle and in which an interruption in the data transmission by an arc occurring between a vehicle-end drive current collector and the traction current conductor is reliably avoided. The method for trandsmitting data via a traction current conductor, in which at the transmitter end at least two data signals including in each case the data in an identical form are fed into the traction current conductor with different frequency channels. In the event of an arc occurring at the receive end, the received data of that data signal or those data signals whose amplitude does not drop below a ratio necessary for achieving a specific bit error probability with respect to the amplitude of the interference signal S(f), is selected for evaluation.

9 Claims, 2 Drawing Sheets

METHOD FOR TRANSMITTING DATA VIA A TRACTION CONTROL WHICH CARRIES AN ELECTRICAL DRIVING CURRENT FOR VEHICLES

CLAIM FOR PRIORITY

This application claims priority to International Application No. PCT/DE00/00556 which was published in the German language on Aug. 31, 2000.

TECHNICAL FIELD OF THE INVENTION

The invention relates to a method for transmitting data via a traction current conductor.

BACKGROUND OF THE INVENTION

German patent 730 713 discloses a method for transmitting data via a traction current conductor with which drive current for rail vehicles can be simultaneously transmitted. In this method, the data can be transmitted between the rail vehicles and between a control center and the rail vehicles. Data is fed, as a data signal on a predefined frequency channel, into the traction current conductor using a transmitter device. The data signal is then transmitted via the traction current conductor to a receiver device and received there. The data signal is then evaluated during the acquisition of reception data corresponding to the data of the transmitter device. In the method described above, the data signal is fed at the rail vehicle end into the traction current conductor via a drive current collector, and received using said traction current conductor, arcs which occur between the traction current conductor and the drive current collector being capable of considerably disrupting the data transmission and, under certain circumstances, even interrupting it because the interference signal of the arc is superimposed on the data signal.

German patent 538 650 also discloses a method in which data is transmitted via a traction current conductor. In this method, data signals containing control commands are generated in a first locomotive and are fed into the traction current conductor for the purpose of the transmission of data to a second locomotive. The data information, that is to say the respective control command, is frequency coded here i.e. a data signal with a predefined frequency is assigned to each control command. The frequency is set in the method using a switching lever in the first locomotive. The data signals pass via the traction current conductor to a receiver device in the second locomotive in which they are received and evaluated.

SUMMARY OF THE INVENTION

In one embodiment of the invention, there is a method for transmitting data via a traction current conductor, which is simultaneously used to transmit a drive current to a vehicle which includes, for example, feeding, at a transmitter end, at least two data signals which each include the data, into the traction current conductor with different frequency channels, generating an arc occurring between the traction current conductor and a drive current collector of the vehicle, a frequency band of which is defined by the frequency channels being greater than the expected spectral bandwidth of an interference signal, transmitting the data signals via the traction current conductor to a receiver device and being received using by the receiver device and evaluating the data signals after the reception, during the acquisition of the reception data corresponding to the data of the transmitter device, wherein in the event of the interference signal occurring, the received data of the data signal whose frequency channels lie outside the spectrum of the interference signal defined by the spectral bandwidth is selected as the reception data.

In one aspect of the invention, the method for transmitting data via a traction current conductor includes, for example, adding check bits to the data at the transmitter end and determining in the receiver device whether the data transmitted with the respective data signals has been transmitted free of errors, and wherein the data signals which have been transmitted free of errors are treated as lying outside the spectrum of the interference signal.

In another aspect of the invention, the method for transmitting data via a traction current conductor includes, for example, feeding at least three data signals into the traction current conductor with different frequency channels, the frequency band including the frequency channels being at least twice as large as the spectral bandwidth of the interference signal, comparing the data items of the received data signals with one another at the receive end; and selecting the received data of the data signals which have a majority of identical data items to one another and are transmitted as the reception data.

In yet another aspect of the invention, the method for transmitting data via a traction current conductor includes, for example, selecting the received data of the data signals whose amplitude has not left a specific amplitude band during the time necessary for the transmission of a data signal as the reception data.

In still another aspect of the invention, the data signals are OFDM signals.

In one aspect of the invention, the method for transmitting data via a traction current conductor includes, for example, transferring the data to a fixed receiver device using a transmitter device of the vehicle.

In another aspect of the invention, the data is transferred to the vehicle using a fixed transmitter device.

In yet another aspect of the invention, the data is transferred to a fixed receiver device using a fixed transmitter device.

In still another aspect of the invention, the data is transferred from the vehicle to another vehicle.

DETAILED DESCRIPTION OF THE INVENTION

Figure 1:
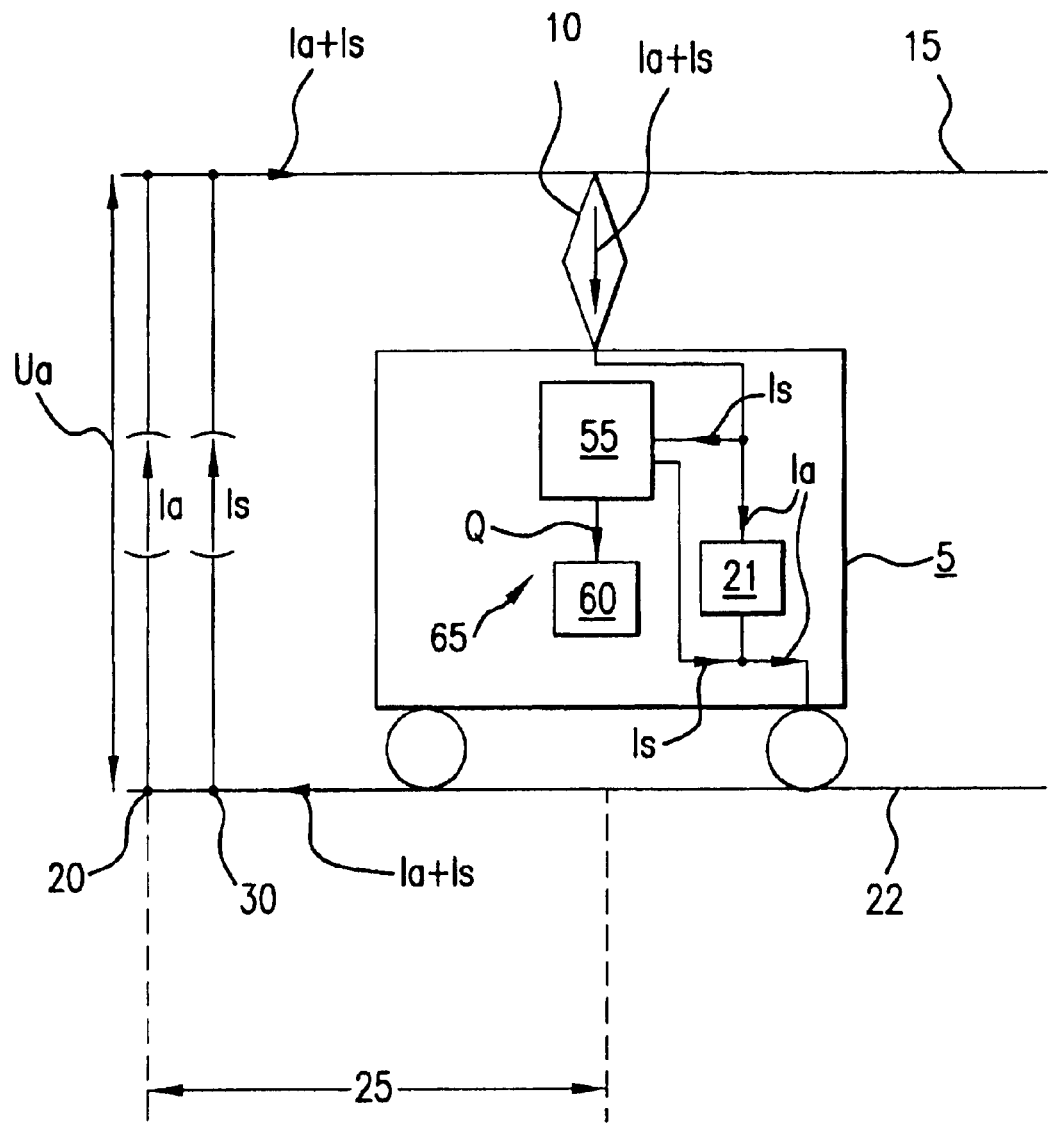
FIG. 1 shows an exemplary embodiment of an arrangement for carrying out the method according to the invention.

The invention discloses a method for transmitting data via a traction current conductor which simultaneously conducts drive current for a vehicle or a plurality of vehicles, in which method interruption of the data transmission by an arc occurring between the drive current collector and the traction current conductor is reliably avoided.

This is achieved according to one embodiment of the invention by a method for transmitting data via a traction current conductor which is simultaneously used to transmit a drive current to a vehicle, in which method at the transmitter end at least two data signals which each include the data are fed into the traction current conductor with different frequency channels, a frequency band which is defined by the frequency channels being greater than the expected spectral bandwidth of an interference signal generated by an arc occurring between the traction current conductor and a drive current collector of the vehicle, the data signals being transmitted via the traction current conductor to a receiver device and being received using the device and the data signals are evaluated after the reception during the acquisition of the reception data corresponding to the data of the transmitter device, in which case, in the event of the interference signal occurring, the received data of that data signal or those data signals whose frequency channels lie outside the spectrum of the interference signal defined by the spectral bandwidth is selected as the reception data.

The method according to the invention can be carried out in the same way if traction current for a plurality of vehicles is transmitted via the traction current conductor. In this case, the frequency band including the frequency channels of the data signals is should be greater than the expected spectral bandwidth of the interference signals of the arcs which occur.

In method according to the invention, transmissions can be made reliably with this data because an occurrence of an arc between the traction current conductor and the drive current collector does not entail an interruption in the data transmission. In the method according to the invention, the data is transmitted simultaneously on different frequency channels, i.e. on different carrier frequencies, with at least two data signals which include the data in an identical form, the frequency band including the frequency channels being greater than the expected spectral bandwidth of the interference signal of the arc so that it is ensured that at least one of the data signals transmitted via the traction current conductor lies outside the spectral bandwidth of the interference signal. If, after the reception of the at least two data signals, that data signal or those data signals whose frequency channels lie outside the spectrum of the interference signal defined by the spectral bandwidth (interference bandwidth) are exclusively evaluated in the receiver device, it is ensured that the data transmission is uninfluenced by the interference signal of the arc.

In order to ensure that a predefined bit error probability is obtained with a data signal lying outside the interference bandwidth, the interference bandwidth can be defined, for example, as a function of the amplitude of the data signals, specifically in such a way that outside this interference bandwidth the amplitude ratio of data signal to interference signal Information on such ratios can be found, for example, in Dostert, K; Bartel, does not drop below the signal-to-noise ratio which results from the desired bit error probability. W.: "Neuartige Datenübertragung auf Stromversorgungsleitungen" [New method of transmitting data on power supply lines], elektro-anzeiger [electrical engineering publication] 42, 12$^{th}$ year (1989).

It is possible to test in a simple, and thus advantageous way, which of the data signals have a frequency channel outside the spectrum of the interference signal by virtue of the fact that, in addition to the data, the data signals are also used to feed check bits into the traction current conductor at the transmitter end, which check bits are used in the receiver device to determine whether the data transmitted with the respective data signals has been transmitted free of errors. The data signals which have been transmitted free of errors are subsequently treated as lying outside the spectrum of the interference signal.

According to another embodiment of the method according to the invention, there is preferably an uneven number, but at least three data signals which are identical in terms of their logic data content are fed into the traction current conductor with different frequency channels, the data items of the received data signals are compared with one another at the receive end and the received data of those data signals of which a majority have transmitted identical data, is selected as the reception data. However, to do this it is necessary for the frequency band including the frequency channels to have at least twice the width of the spectral bandwidth of the interference signal generated by the arc.

A further advantageous embodiment of testing the freedom from errors of a data signal transmitted on a frequency channel is to recognize as being transmitted free of errors data signals whose carrier frequency has not left a specific amplitude band over a specific time period. Thus, for example, it may be necessary to cancel the requirement that data signals whose amplitude has not dropped below 50% of the transmission amplitude and has not exceeded 150% of the transmission amplitude during the time necessary to transmit a data signal are considered as being transmitted free of errors. The data can be transmitted reliably, and thus advantageously, if the data signals are fed into the traction current conductor in coded form by means of OFDM or spread spectrum methods because signals which are coded in such a way are particularly insensitive to interference.

The method according to the invention can be carried out in such a way that the data is transmitted from a vehicle to a control center and/or to one or more other vehicles. The transmission of data can also take place bidirectionally. In addition, the method according to the invention can also be used to transmit data to a fixed reception point using a fixed transmitter device via a traction current conductor on which arcs occur. Moreover, the method according to the invention also be used to transmit control signals, as data or data signals, to one or more vehicles, for example rail vehicles, from a control center so that the method according to the invention can be used as a vehicle control method, and in particular as an automatic train control method in the case of rail vehicles.

FIG. 1 shows a rail vehicle 5 which is connected by a drive current collector 10 to a contact wire 15 as traction current conductor. A drive voltage Ua is applied to the contact wire 15 at a drive current feed point 20, as a result of which drive voltage Ua a drive current Ia flows through the contact wire 15, the drive current collector 10 and a drive motor 21 of the rail vehicle 5. The return flow of the drive motor Ia is ensured by rails 22 on which the rail vehicle 5 travels. The drive current feed point 20 and the drive current collector 10 and its position define a line section 25.

Data signals D1 to D11 in the form of a data signal stream Is are fed into the contact wire 15 at a data signal feed point 30 with a transmitter device, which can be arranged, for example, in a control center. The data signals D1 to D11 each include identical data Q and pass via the drive current collector 10 to the rail vehicle 5. The return flow of the data signals D1 to D11 or of the data signal stream Is is ensured by the rails 22. The data signals D1 to D11 and the data signal stream Is pass via the drive current collector 10 here specifically to a selector device 55 and then from there to the rails 22. It assumed in this case that the drive motor 21, whether in itself or as a result of correspondingly embodied operating current filter circuits assigned to the direct motor 21, has such a high impedance for the data signal stream Is that the data signal stream Is flows away through the drive motor 21 to a negligibly small degree. Arranged downstream of the selection device 55 on the output side is an evaluation device 60 which forms, together with the selection device 55, a receiver device 65 for the rail vehicle 5 for receiving the data signal stream Is or the data signals D1 to D11.

The method of operation of the selection device 55 is intended to be explained below with reference to an example. It is assumed, for purposes of this example, that the received data of the data signals D1, D4 and D6 to D11 are identical, whereas the received data of the data signals D2, D3 and D5 differ from the received data of the data signals D1, D4 and D6 to D11. It is also assumed that the received data of the data signals D2, D3 and D5 are disrupted by an arc between the drive current collector 10 and the contact wire 15 or by an interference signal S(f) generated by this arc and must not be evaluated as reception data for this reason.

In the evaluation device 55, the received data items of the data signals D1 to D11 are compared with one another, and the received data Q of the data signals D1, D4 and D6 to D11 are selected as the reception data of the receiver device 65 and transferred to the selection device 60. Because the data signals D1, D4 and D6 to D11 include identical data, they have been transmitted without disruption, and consequently their frequency channel lies outside the interference spectrum of the interference signal in each case.

Figure 2:
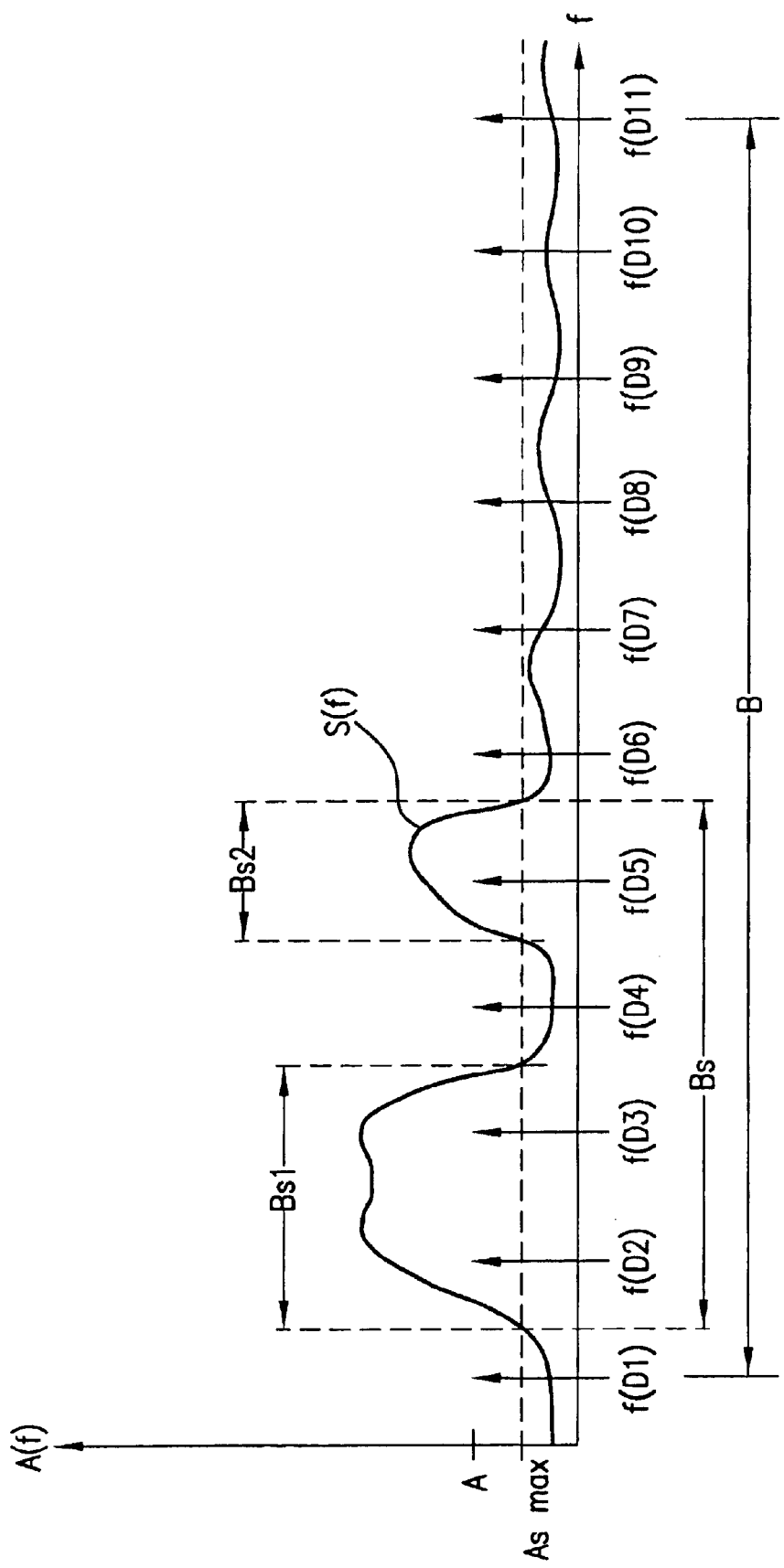
FIG. 2 shows a frequency spectrum of data signals suitable for transmitting data in accordance with one exemplary embodiment in FIG. 1.

This fact will be explained in more detail once more in conjunction with FIG. 2. FIG. 2 shows, in the frequency range, the amplitude spectrum A)f of the data signals D1 to D11 and of the interference signal S(f) which is brought about by the arc between the drive current collector 10 of the rail vehicle 5 and the contact wire 15. In addition, carrier frequencies f(D1) to f(D11) of the data signals D1 to D11 are indicated in FIG. 2. In the following description, it is assumed by way of example that an amplitude-referred signal-to-noise ratio of 6 dB is to be achieved for data transmission. In FIG. 2 this 6 dB limit is characterized by an amplitude limiting value Asmax which indicates the maximum acceptable interference amplitude of the interference signal S(f) for the 6 dB signal-to-noise ratio at an amplitude A of the data signals D1 to D11. Given a signal-to-noise ratio of 6 dB, a bit error probability of less than $10^{-6}$ is achieved. It is apparent in FIG. 2 that the interference spectrum of the interference signal S(f) includes two frequency segments Bs1 and Bs2 in which the required signal-to-noise ratio is not reached by the data signals on their part in the case of their own frequency basis. Specifically, it is in fact apparent in FIG. 2 that the amplitudes of the data signals D2, D3 and D5 do not reach the predefined signal-to-noise ratio of 6 dB with their frequency channels, i.e. that is to say with their carrier frequencies f(D2), f(D3) and f(D5), and are thus subject to interference. On the other hand, the amplitudes of the other data signals D1, D4 and D6 to D11 are outside the two frequency sections Bs1 and Bs2 with their frequency channels or with their carrier frequencies f(D1), f(D4) and f(D6) to f(D11), and are thus above the required signal-to-noise ratio, so that these data signals D1, D4 and D6 to D11 are not affected by the interference signal S(f).

The exemplary embodiment described in conjunction with FIGS. 1 and 2 for transmitting the data Q makes use of the fact that even when arcs occur, reliable transmission of data can be achieved via a traction current conductor, such as a contact wire, a traction current rail or the like. In this caes, if the frequency band B including the frequency channels of the data signals is at least twice as wide as the spectral band width Bs of the interference signal S(f) generated by the arc, the majority of the data signals then lie outside the interference spectrum of the arc short circuit. In terms of the exemplary embodiment, the following therefore apply for the frequency band B, and thus for the carrier frequencies F(D1) to f(D11) of the data signals D1 to D11:

$$B=f(D11)-f(D1)>2*Bs$$

Bs designates here the spectral bandwidth of the interference signal S(f). Bs can be determined in different ways in the exemplary embodiment according to FIG. 2: first, it is possible to determine Bs by summing the spectral bandwidth of the two frequency segments Bs1 and Bs2 so that the following is obtained for Bs:

$$Bs=Bs1+Bs2.$$

Another, second possible way of determining the spectral bandwidth Bs is to acquire Bs by forming the frequency difference between the maximum frequency of the frequency segment Bs2 and the minimum frequency of the frequency segment Bs1, as is indicated in FIG. 2 by the reference Bs. The value for Bs is somewhat larger in the second case as oppossed to the first because the frequency range between the two frequency segments Bs1 and Bs2 is not taken into account. This does not, however, have any influence on the ability to carry out the described method to transmit the data Q because both methods of determining Bs ensure reliable transmission of data. In practice, the second method for determining the numerical value for Bs could be quicker and simpler because the frequency spectrum does not need to be known in detail.

Owing to the generally very broadband interference signals of arcs, it has proven appropriate in practice if the frequency band containing the frequencies of the individual channels is located at a frequency range of approximately 10 kHz to approximately 20 MHz because the bandwidth Bs of arcs generally has a maximum size of approximately Bs=5 MHz. The distance between the individual channels is thus obtained from the frequency band divided by the number of frequency channels used. The number of approximately 128 to 1024 data signals or channels is generally sufficient in practice. It is possible to take into account the condition of the drive current collector 10 and ambient influences, for example rain, in the selection of the frequency band and the frequency channel spacing because such influences can effect the spectrum of arcs.

It is possible, for example, to transmit binary coded signals, preferably by means of FSK (Frequency Shift Keying), OFDM (Orthogonal Frequency Division Multiplexing), or Spread Spectrum-coded signals as data signals D1 to D11. Furthermore, control signals can also be fed into the contact wire 15 as data or data signals. If control signals are transmitted to the rail vehicle 5 using the transmitter device, which may be arranged, as already explained, in a control center, for example, the described method can be used as an automatic train control method for transmitting control information to the rail vehicle 5.

The method can advantageously be used not only in rail vehicles but also in trolley buses, cable cars or suspended railways.

The exemplary embodiment according to FIG. 1 shows that the data signal stream Is is coupled into the rail vehicle 5 via the drive current collector 10. Alternatively, it is possible to feed the data signal stream Is into the rail vehicle 5 inductively, as is described, for example, in German laid-open application 1 405 691. The same applies correspondingly to the coupling of the data signal stream Is into the traction current conductor 15 at the control signal feed point 30. This is because the coupling can also in principle be effected inductively.

What is claimed is:

1. A method for transmitting data via a traction current conductor, which is simultaneously used to transmit a drive current to a vehicle, comprising:

feeding, at a transmitter end, at least two data signals which each include the data, into the traction current conductor with different frequency channels;

generating an arc occurring between the traction current conductor and a drive current collector of the vehicle, a frequency band of which is defined by the frequency channels being greater than the expected spectral bandwidth of an interference signal;

transmitting the data signals via the traction current conductor to a receiver device and being received using by the receiver device; and evaluating the data signals after the reception, during the acquisition of the reception data corresponding to the data of the transmitter device, wherein in the event of the interference signal occurring, the received data of the data signal whose frequency channels lie outside the spectrum of the interference signal defined by the spectral bandwidth is selected as the reception data.

2. The method as claimed in claim 1, further comprising:

adding check bits to the data at the transmitter end; and determining in the receiver device whether the data transmitted with the respective data signals has been transmitted free of errors, and wherein the data signals which have been transmitted free of errors are treated as lying outside the spectrum of the interference signal.

3. The method as claimed in claim 1, further comprising:

feeding at least three data signals into the traction current conductor with different frequency channels, the frequency band including the frequency channels being at least twice as large as the spectral bandwidth of the interference signal;

comparing the data items of the received data signals with one another at the receive end; and selecting the received data of the data signals which have a majority of identical data items to one another and are transmitted as the reception data.

4. The method as claimed in claim 1, further comprising:

selecting the received data of the data signals whose amplitude has not left a specific amplitude band during the time necessary for the transmission of a data signal as the reception data.

5. The method as claimed in claim 1, wherein the data signals are OFDM signals.

6. The method as claimed in claim 1, further comprising:

transferring the data to a fixed receiver device using a transmitter device of the vehicle.

7. The method as claimed in claim 1, wherein the data is transferred to the vehicle using a fixed transmitter device.

8. The method as claimed in claim 1, wherein the data is transferred to a fixed receiver device using a fixed transmitter device.

9. The method as claimed in claim 1 wherein the data is transferred from the vehicle to another vehicle.

* * * * *